United States Patent
Myöhänen et al.

(10) Patent No.: US 7,244,399 B2
(45) Date of Patent: Jul. 17, 2007

(54) GRID CONSTRUCTION FOR A FLUIDIZED BED REACTOR

(75) Inventors: Kari Myöhänen, Kotka (FI); Frank Taibi, Hampton, NJ (US); Harri Vilokki, Kyminlinna (FI)

(73) Assignee: Foster Wheeler Energia Oy, Helsinki (FI)

( * ) Notice: Subject to any disclaimer, the term of this patent is extended or adjusted under 35 U.S.C. 154(b) by 579 days.

(21) Appl. No.: 10/132,375

(22) Filed: Apr. 26, 2002

(65) Prior Publication Data

US 2003/0202912 A1 Oct. 30, 2003

(51) Int. Cl.
*B01J 8/44* (2006.01)
(52) U.S. Cl. .......................... 422/143; 422/311; 34/582
(58) Field of Classification Search ............... 422/311, 422/143; 34/582, 583; 110/245; *B01J 8/44*
See application file for complete search history.

(56) References Cited

U.S. PATENT DOCUMENTS

| 3,283,413 A | 11/1966 | Mayer et al. ................. 34/57 |
| 3,508,341 A * | 4/1970 | Carr ............................. 34/576 |
| 3,583,077 A | 6/1971 | Vian-Ortuno et al. .......... 34/10 |
| 4,372,228 A | 2/1983 | Korenberg ................... 110/347 |
| 4,402,665 A | 9/1983 | Korenberg ................... 431/170 |
| 4,748,916 A * | 6/1988 | Nordh ....................... 110/182.5 |
| 4,854,854 A | 8/1989 | Jonsson ...................... 431/170 |
| 5,395,516 A | 3/1995 | Gray ............................ 210/87 |
| 5,395,596 A | 3/1995 | Winkin et al. ............... 422/142 |

FOREIGN PATENT DOCUMENTS

| DE | 43 31 544 A1 | 3/1995 |
| EP | 0 107 377 | 9/1983 |
| JP | 4-335904 | 11/1992 |
| WO | WO 99/14530 | 3/1999 |

\* cited by examiner

*Primary Examiner*—Glenn Caldarola
*Assistant Examiner*—Jennifer A. Leung
(74) *Attorney, Agent, or Firm*—Fitzpatrick, Cella, Harper & Scinto

(57) ABSTRACT

A grid construction for a fluidized bed reactor, the reactor including a reaction chamber defined by substantially vertical walls, in which a fluidized bed of solid particles is maintained, and a windbox under the reaction chamber, in a lower portion of the reactor. The grid construction is positioned between the reaction chamber and the windbox and includes (a) multiple continuous nozzle lines for distributing fluidizing gas from the windbox into the reaction chamber, for suspending the fluidized bed in the reaction chamber, and (b) continuous trenches between the nozzle lines. The nozzle lines include multiple gas outlets, having a main gas flow direction, at side faces of said nozzle lines, for directing fluidizing gas jets towards an adjacent trench.

12 Claims, 7 Drawing Sheets

GRID CONSTRUCTION FOR A FLUIDIZED BED REACTOR

BACKGROUND OF THE INVENTION

The present invention relates to a grid construction for a fluidized bed reactor and a method of using such a grid construction for removing coarse material from the bottom of a fluidized bed reactor. More particularly, the present invention relates to a durable grid construction optimized for reliable and efficient removal of coarse material from a fluidized bed reactor.

Fluidized bed reactors comprise a reaction chamber, defined by vertical walls, having a fluidized bed of solid particles maintained therein, a windbox in a lower portion of the reactor under the reaction chamber, and a grid construction between the reaction chamber and the windbox for supporting the fluidized bed in the reaction chamber. In the grid construction, there are typically means, such as nozzles, for distributing fluidizing air or other gas into the reaction chamber from the windbox.

Fluidized bed reactors are used for different processes, such as combustion or gasification of solid fuel, which may produce coarse residue material which accumulates on the bottom of the reaction chamber, i.e., on the grid. The accumulation of the coarse material may be a problem especially when solid fuels rich in non-combustible material, such as stones or scrap iron, are processed in the reaction chamber, or when the process generates such coarse material, as, for example, ash agglomerations. Coarse material accumulating on the grid should be removed before it interacts detrimentally with the operation of the fluidized bed, e.g., by preventing appropriate distribution of fluidizing gas or process gas into the reaction chamber. Thus, effective equipment is needed in fluidized bed reactors for adequate removal of coarse material from the bottom of the reactor. Usually at least one discharge duct is provided at the bottom of the reactor chamber for withdrawing solids (i.e., coarse material) from the reactor.

A conventional material discharge channel or a few material outlet pipes placed at the bottom of a reactor chamber are, however, often not sufficient for efficient removal of coarse material, as random movement generated by the fluidizing air is not capable of transporting heavy or unfavorably-shaped pieces horizontally for long distances. Also, the migration of material along the bottom of the reactor chamber is especially hampered when the bottom has upwardly projecting air nozzles or other irregularities, to which the coarse material may stick.

An attempt to improve the removal of material from the bottom of a fluidized bed is to use directional fluidizing air nozzles which, by blowing, guide the material towards the discharge opening or duct, as disclosed, e.g., in U.S. Pat. No. 5,395,596. However, separate air nozzles are prone to erosion, and coarse material may stick into the nozzles.

Another approach is that the bottom of the reaction chamber could be stepped or slanted downwards towards the outlet, whereby the gravitation assists the horizontal migration of the material. Such a solution has been presented, for example, in U.S. Pat. No. 4,372,228. The problem with these solutions may, however, be abrasion of the nozzles and regions in their vicinity, caused by the moving material and by the transport air being fed at a high velocity. It is also difficult to ensure an even air feed over the entire grid area due to the different bed pressures at various nozzles, at least when the bottom has significant level differences.

U.S. Pat. No. 4,748,916 discloses a nozzle with a substantially horizontal upper portion, and an arrangement of such nozzles disposed at the bottom of a fluidized bed combustor. The nozzles direct two diverging air jets from their front ends horizontally towards areas between adjacent nozzles. This patent aims to provide a durable nozzle which supplies air in such a manner that coarse material can be moved along the bottom of the bed. However, the construction provides a highly varying flow velocity field at the bottom, and thus, there is a risk of erosion or accumulation of coarse particles in low velocity areas.

As can be realized from the above description of the prior art, there is a need for a new grid construction by which coarse ash and other non-combustibles can be efficiently and reliably transported to ash withdrawal from the entire bottom area of a fluidized bed reactor.

SUMMARY OF THE INVENTION

An object of the present invention is thus to provide an improved grid construction wherein the drawbacks mentioned above have been minimized.

A special object of the present invention is to provide a durable grid construction with improved coarse material discharge.

Another object of the present invention is to provide a grid construction, in which the sticking of material to the fluidizing air nozzles has been minimized.

In order to achieve these and other objects of the present invention, a new apparatus and method are provided, as described in the appended claims.

Thus, according to the present invention, a grid construction for a fluidized bed reactor is provided, the reactor comprising a reaction chamber defined by substantially vertical walls in which a fluidized bed of solid particles is maintained, and a windbox under the reaction chamber in a lower portion of the reactor, the grid construction being positioned between the reaction chamber and the windbox and comprising multiple continuous nozzle lines, for distributing fluidizing gas from the windbox into the reaction chamber, for suspending the fluidized bed in the reaction chamber, and continuous trenches between the nozzle lines, each nozzle line comprising multiple gas outlets at a side face of a respective nozzle line, for directing fluidizing gas jets towards an adjacent trench.

Also, according to the present invention, a method of removing coarse material from a fluidized bed reactor is provided, wherein the method comprises the steps of:
(a) maintaining a fluidized bed of solid particles in a reaction chamber of the fluidized bed reactor by injecting fluidizing gas jets from a windbox in a lower portion of the reactor into the reaction chamber through a grid construction, the grid construction including multiple continuous nozzle lines for distributing fluidizing gas from the windbox into the reaction chamber for suspending the fluidized bed in the reaction chamber, and (b) removing coarse material from a bottom of the reaction chamber, wherein step (b) comprises transporting coarse material along multiple trenches arranged in the grid construction between the multiple nozzle lines, by combined gas streams formed from the gas jets.

The grid construction according to the present invention, comprising nozzle lines and trenches between the nozzle lines, differs from a so-called air bar grid in that in the present invention the trenches are generally solids-tight and, thus, coarse material does not fall between the nozzle lines to a collection funnel below the grid. An essential function of the grid is to provide means for transporting coarse material horizontally along the trenches to, for example, a discharge duct. The nozzle lines and trenches are simple, continuous structures providing smooth surfaces and a well-defined fluidizing gas velocity field so as to transport coarse material efficiently and reliably on the grid.

According to a preferred embodiment of the present invention, the multiple nozzle lines comprise multiple nozzle units having side faces and end faces, wherein successive nozzle units are in mutual contact on their end faces so as to form one of the multiple nozzle lines.

Preferably, the nozzle lines comprise gas outlets at their two opposite side faces for directing fluidizing gas jets to two adjacent trenches. The flow direction of the gas outlets may be substantially horizontal, so as to form a substantially horizontal gas jet. By utilizing horizontal gas jets, the efficiency of transferring material along the bottom of the reaction chamber is maximized. However, with some materials, it may be advantageous to have a slightly downwards, e.g., by about five to ten degrees, slanted gas flow direction in order to minimize the risk of backshifting of the material to the windbox or inside the nozzle units.

According to a preferred embodiment of the present invention, the grid construction comprises one or more discharge ducts for withdrawing coarse material from the reaction chamber, and the flow direction of the gas outlets forms an angle with the normal of an adjacent trench so as to direct solid material along the trench towards a discharge duct. Preferably, the grid construction consists of several grid areas comprising parallel nozzle lines and trenches, thus having a certain material flow direction. The grid areas are arranged so that coarse material is eventually collected from the whole grid area to the discharge ducts.

The gas outlet channels of the nozzles may have a circular cross section. However, in order to obtain a very even air distribution in the trenches, the gas outlets are preferably mainly horizontal, i.e., their horizontal width is much larger than their respective height. The width of the gas outlets is preferably at least four times their respective height. Alternatively, the gas outlets may comprise several smaller openings in a row. The width of the gas outlets may cover a substantial portion of the side faces of the nozzle units. The total horizontal width of the gas outlets in a side face of a nozzle line extends preferably at least about 20%, more preferably at least about 40%, of the total horizontal dimension of the side face of the respective nozzle line.

In order to feed the gas to the gas outlets, the nozzle units may comprise a vertical duct in flow connection with the windbox and the gas outlets. Gas outlet openings or channels may be connected directly to the vertical duct. However, especially when using flat gas outlets, the nozzle units preferably comprise a substantially horizontal center channel connecting the vertical duct and the gas outlets. The center channel may have a vertical cross-sectional area decreasing in flow direction so as to provide an even flow velocity in the flat gas outlets.

An even flow velocity is very important because return flows towards the nozzle unit may otherwise be generated at some portions of the outlets. A return flow may collect material within the nozzles and cause rapid erosion of the nozzles. An uneven flow velocity would also imply an unnecessary high flow velocity at some portion of the gas jet, which increases the risk of erosion due to impingement into an adjacent surface, e.g., the side face of a nozzle on the opposite side of an adjacent trench.

The flow velocity field provided by the nozzles affects strongly the efficiency of the transfer of coarse material on the bottom of the reactor. By utilizing the present invention, a well-defined flow velocity field can be provided. When optimizing the number, sizes and shapes of the gas outlets, the gas flow in the trenches is well directed along the trench and has a relatively constant velocity, e.g., 30-50 m/s. Immediately above the trenches and nozzle lines, the gas flow is still quite well directed and has a velocity of, e.g., 10-30 m/s. Higher up from the reactor bottom, the main direction of the gas flow is upwards and the velocity is at a level of the superficial fluidization velocity, e.g., 2-8 m/s.

The flow velocities needed in a specific application depend on the materials and reactor construction used in the application. With the present grid construction, coarse solid materials are transported efficiently on the bottom of the reactor without very high gas flow velocities at the outlets of the nozzles. Thus, the risk of erosion of the grid is minimized. With the present construction, the flow velocities can be easily optimized by varying the dimensions of the gas outlets of the nozzles or the pressure of the windbox.

The gas outlets may be simple openings or channels having sufficient axial length and sidewalls which define the flow direction of the outlet. However, with some nozzle unit constructions according to the present invention, it is advantageous to have guiding elements within the gas outlet channels in order to improve the directionality of the gas jets. Such guiding elements may, e.g., be used when very wide horizontal gas outlets, covering most of the side faces of the nozzle lines, are used in order to distribute gas evenly throughout the trenches.

Fluidizing gas nozzles must have a sufficient pressure drop in order to guarantee even and stable fluidization in the reaction chamber. According to a preferred embodiment of the present invention, the main pressure drop of the nozzles is provided by a control plate disposed at the upper portion of the vertical air tube, preferably at the top edge of the tube. Preferably, the control plate has a hole, the size of which can be adjusted to obtain the required pressure drop. When using the air nozzles in a slanted bottom, the pressure drops have to be different for nozzles at different elevations of the bottom in order to provide an even gas flow rate through the nozzles. With a control plate, the pressure drop of the nozzles at high elevations of the bottom can be easily adjusted to be higher than the pressure drop of nozzles at lower elevations.

As an alternative to a control plate at the top portion of the vertical air tubes, the pressure drop of the nozzles also can be adjusted in some other areas of the construction. The pressure drop can be adjusted by a constriction at the bottom portion of the vertical air duct, at the center channel, or at the outlet openings of the nozzles. However, a constriction at the bottom portion of the air duct increases the risk of backshifting and a constriction in the center channel or at the outlet openings may hamper even gas flow distribution.

The nozzle units are advantageously made by casting. They can be made either of cast metal or of cast refractory. When the nozzle units are made of cast refractory and the trenches are covered by refractory, an extremely durable grid construction is formed. However, because the grid nozzles are typically used in very harsh conditions, after some operation time, they have to be replaced by new nozzles. Thus, easy replacement is an essential feature of the grid nozzles. Because of an advantageous general form of the present nozzles, they can be installed by many advantageous ways. One possibility is to attach the nozzles directly to the vertical air duct by a pin across the nozzles. Another possibility is to install the nozzles by lugs on the sides of the nozzles. When the installation has been made, the nozzles are advantageously immersed in refractory material, covering the attachment means and extending up to the level of the lower edge of the outlet openings.

BRIEF DESCRIPTION OF THE DRAWINGS

The above brief description, as well as further objects, features and advantages of the present invention will be more fully appreciated by reference to the following detailed description of the presently preferred, but nonetheless illustrative, embodiments in accordance with the present invention, when taken in conjunction with the accompanying drawings, wherein.

DETAILED DESCRIPTION OF THE PREFERRED EMBODIMENTS

Figure 1:
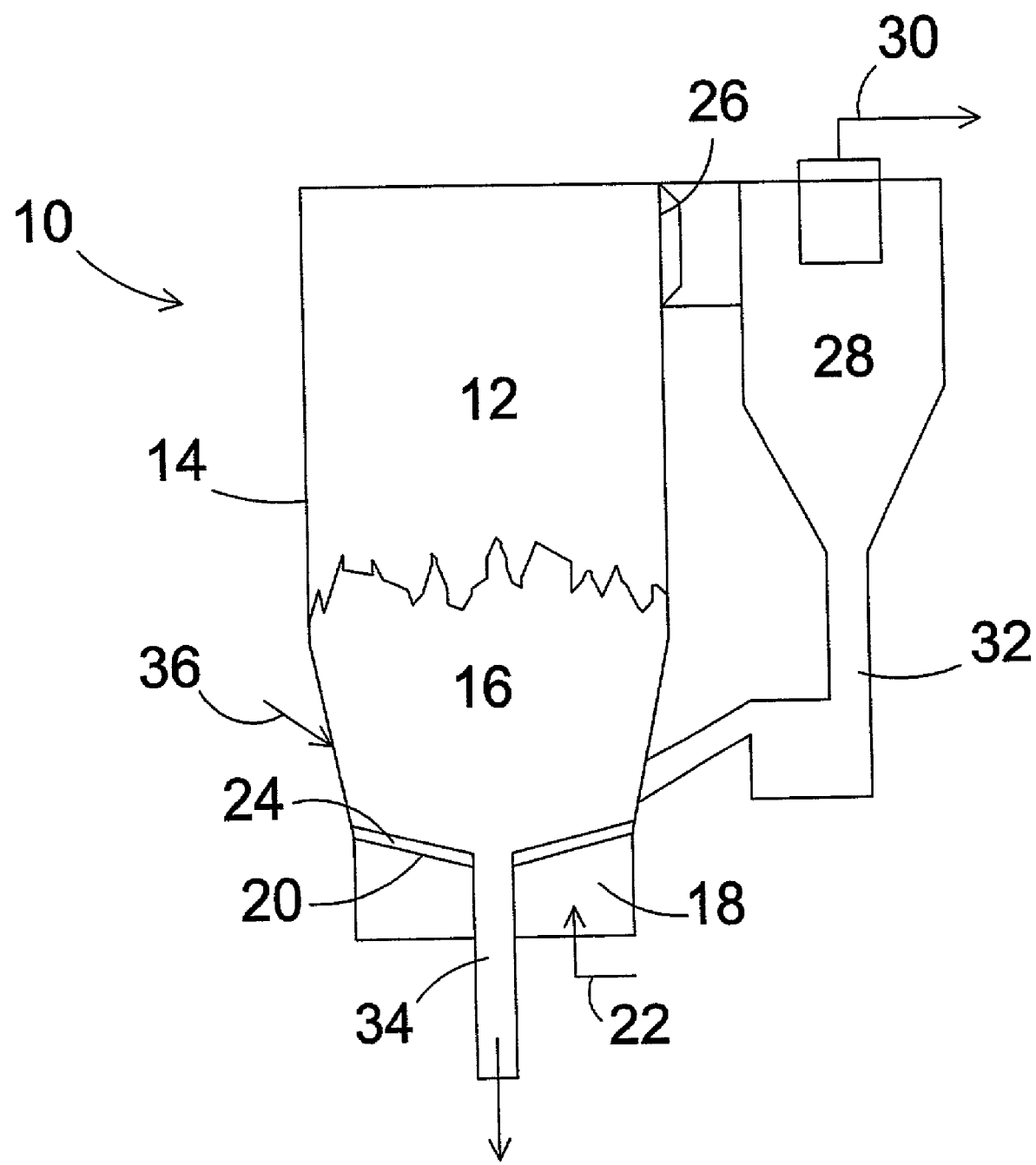
FIG. 1 is a schematic cross-sectional view of a fluidized bed reactor with a grid construction according to the present invention.

FIG. 1 depicts, in vertical cross section, a fluidized bed reactor 10 with a reaction chamber 12 defined by vertical walls 14 in which a fluidized bed 16 of solid particles is maintained. In a lower portion of the reactor 10, under the reaction chamber 12, is a windbox 18. Between the reaction chamber 12 and the windbox 18 is positioned a grid 20 for suspending the fluidized bed 16 in the reaction chamber. The bed 16 is maintained in a fluidizing state by introducing fluidizing gas through fluidizing gas inlet means 22 to the windbox 18 from where the gas is injected to the reaction chamber 12 through nozzle lines 24 disposed in the grid 20.

FIG. 1 shows a fast fluidized bed reactor, in which the velocity of the fluidizing gas in the reaction chamber 12 is so high that solid particles, such as solid fuel, possible absorbents and inert bed material, are entrained with the fluidizing gas to the upper part of the reaction chamber 12 and through an outlet opening 26 to a cyclone 28. In the cyclone 28, most of the solid particles entrained with the exhaust gases are separated from the exhaust gases. The thus cleaned exhaust gases are discharged through a gas discharge 30 and the separated solid particles are returned to the reaction chamber 12 through a return duct 32. Alternatively, the reactor 10 could also be of some other type of a fluidized bed reactor, such as a slow fluidized bed reactor.

The processes taking place in the reaction chamber 12, such as combustion or gasification of solid fuel, usually produce fine residual material, such as ash or char, which is due to the fluidizing gas being in constant vigorous motion, and can be removed from the reaction chamber 12 through a discharge duct 34. However, the processes in the reaction chamber 12 may also generate coarse solid material, such as ash agglomerations, which descend to the bottom of the chamber 12, and only drift to the outlet 34 with special measures. The solid materials introduced to the reaction chamber 12 through inlet means 36 may also include coarse solid particles, such as stones or scrap iron, which have to be removed from the bottom of the reaction chamber 12. In order to assist the migration of the coarse material on the bottom of the reaction chamber 12, the grid 20 may be slanted towards the discharge duct 34, as shown in FIG. 1. However, the present construction of the grid 20 provides a new efficient device and method for transporting coarse material towards the discharge duct 34, as is shown in more detail in FIG. 2.

Figure 2:
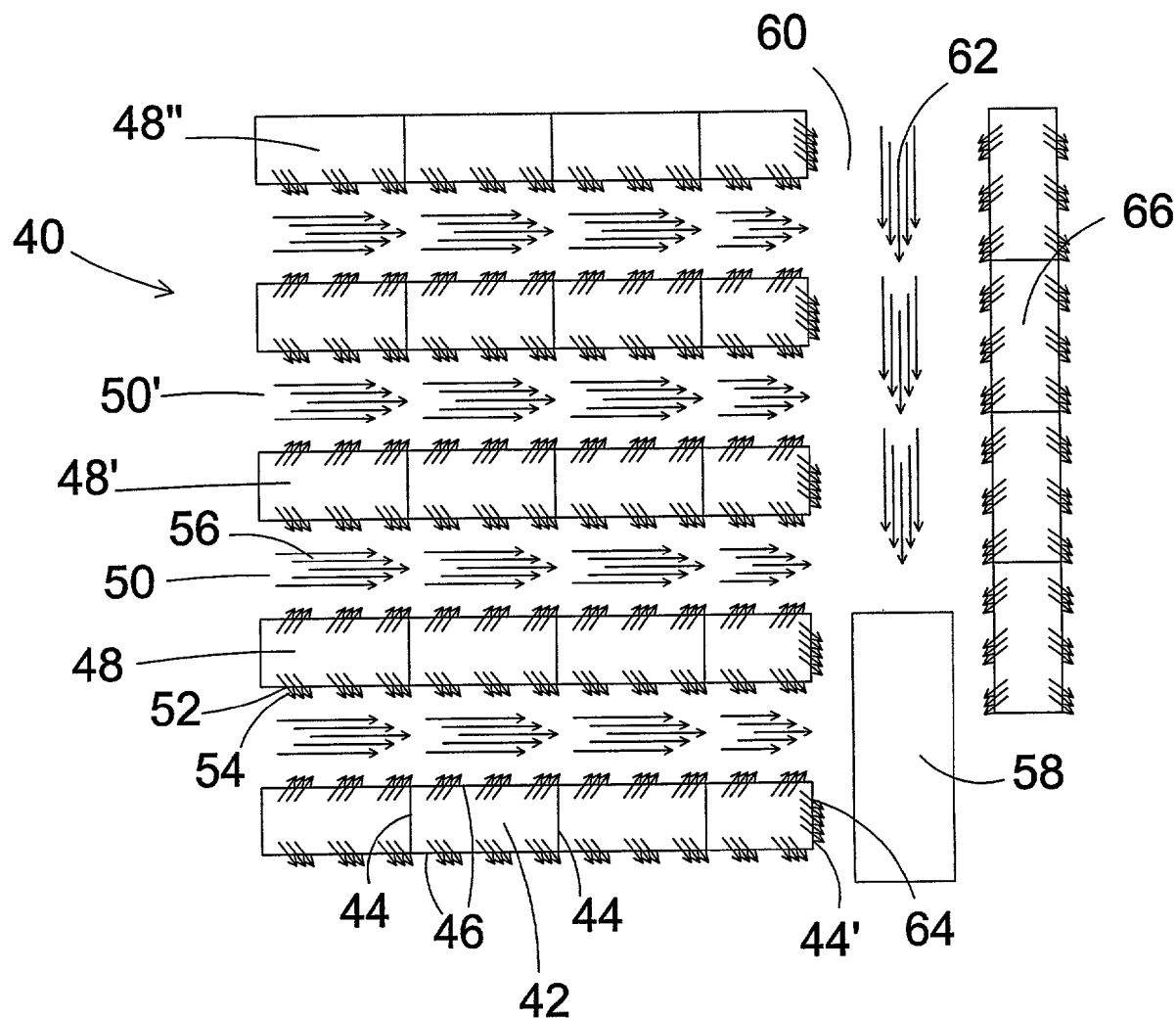
FIG. 2 is a schematic view of a portion of a grid construction according to the present invention.

FIG. 2 illustrates a portion of a grid construction 40 according to the present invention. The grid construction 40 comprises nozzle units 42 having end faces 44 and side faces 46. The nozzle units 42 form continuous nozzle lines 48, 48' by being in mutual contact by their end faces 44. The nozzle lines 48, 48' are preferably simple solid lines without protrusions or recesses which would cause uneven and unstable fluidizing air flow patterns. Such uneven or unstable flow patterns would hamper the flow of solid material on the grid, and would increase the risk of erosion of the grid construction 40. A trench 50, i.e., a smooth linear portion of the grid 40, at a level lower than the tops of the nozzle lines 48, 48', is formed between each pair of adjacent parallel nozzle lines 48, 48'.

The side faces 46 of the nozzle units 42 comprise gas outlets 52, through which fluidizing gas jets 54 are injected to the adjacent trenches 50, 50'. The gas outlets 52 are preferably formed so that they direct the gas jets 54 at an angle, e.g., from about 20° to about 70°, with respect to the normal of the adjacent trench 50, 50'. Thus, the gas jets 54 form in each trench 50, 50' a combined gas stream 56 which moves coarse solid material efficiently along the trench 50, 50' towards a solid material discharge opening 58.

The combined gas streams 56 may conduct solid material directly to the discharge opening 58 or to a collection area 60, where material collected from several trenches 50, 50' is transported towards the discharge opening 58, e.g., by an efficient gas stream 62. Such an efficient gas stream can be provided, e.g., by special gas outlet openings 64 in the end faces 44' of the nozzle units 42 adjacent to the collection area 60. The bottom of the collection area 60 may be slanted towards the discharge opening 58. The collection area 60 may also comprise nozzle lines 66 perpendicular to the first nozzle lines 48.

As is obvious to a person skilled in the art, there are many alternative ways to construct a bottom grid from multiple grid portions, each comprising parallel nozzle lines and trenches, and collection areas so that coarse solid material is efficiently transported to discharge openings from the whole bottom area of a fluidized bed reactor. The arrangement of outlet openings in the nozzle lines and units may depend on their position in the grid. As an example, nozzle lines on an edge of the grid, such as nozzle line 48″ shown in FIG. 2, may comprise gas outlets 52 only on one side face 46.

Figure 3A:
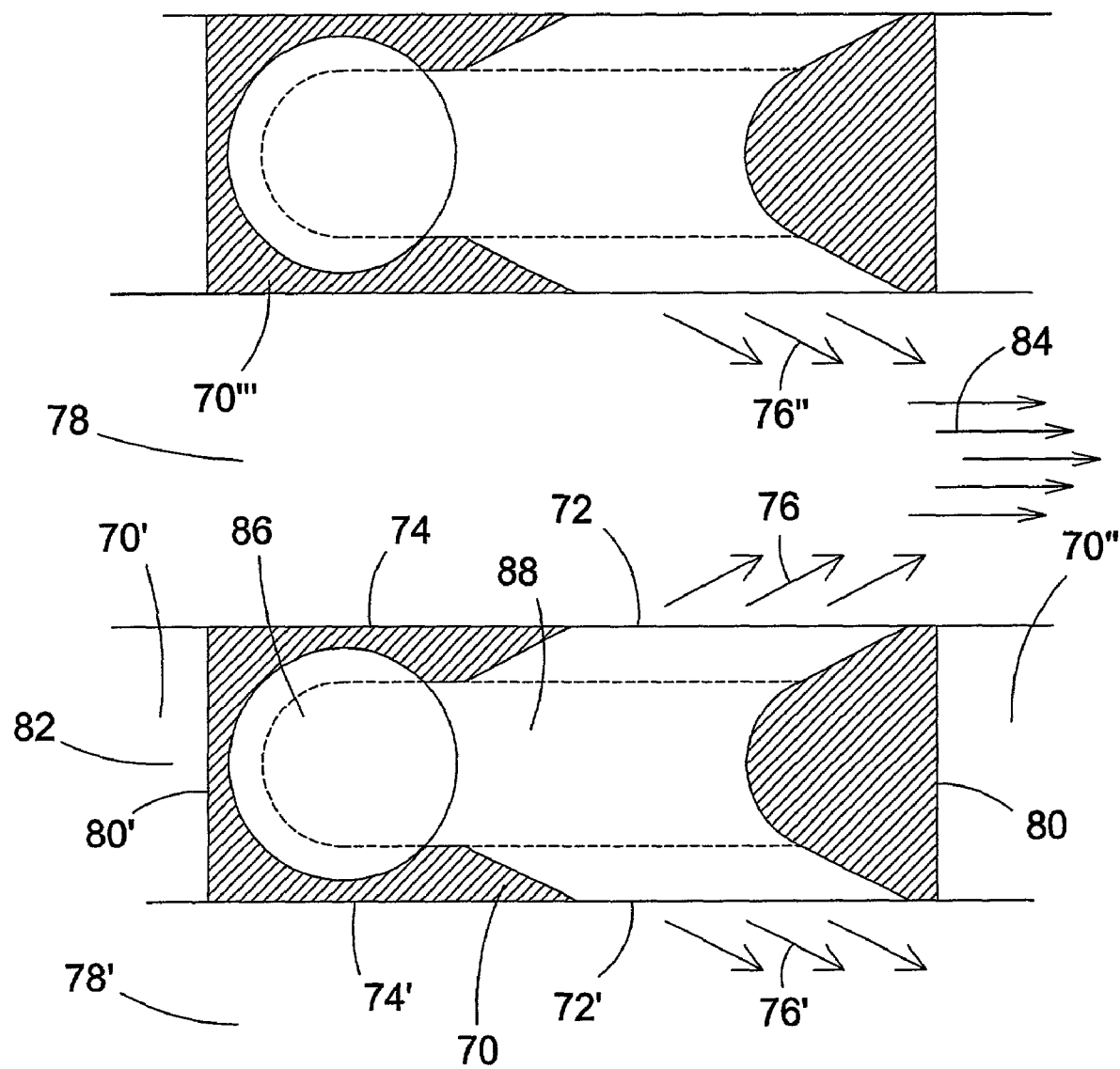
FIG. 3a is a schematic, horizontal cross-sectional view of nozzle units according to a first embodiment of the present invention.

FIGS. 3a, 3b, 3c and 3d depict a first preferred embodiment of a nozzle unit 70 to be used in a grid construction 40 according to the present invention. FIG. 3a shows a horizontal cross section of the nozzle unit 70, with two gas outlets 72 and 72′ at the side faces 74 and 74′ of the nozzle unit, respectively. Fluidizing gas jets 76, 76′ are injected through the gas outlets 72, 72′ to adjacent trenches 78, 78′.

The nozzle unit 70 is connected by its end faces 80 and 80′ to similar adjacent nozzle units 70′ and 70″. The nozzle units 70, 70′, 70″ form a portion of a nozzle line 82 with smooth combined side faces. In the trench 78, the gas jets 76 and 76″ from nozzle units 70 and 70‴ located at the opposite sides of the trench 78 merge as a combined gas flow 84, which transports coarse material efficiently along the trench 78. At the same time, e.g., the jet 76″ and the material in trench 78 protect the nozzle unit 70‴ from erosion which would otherwise be caused by the high velocity gas jet 76 from the nozzle unit 70.

Figure 3B:
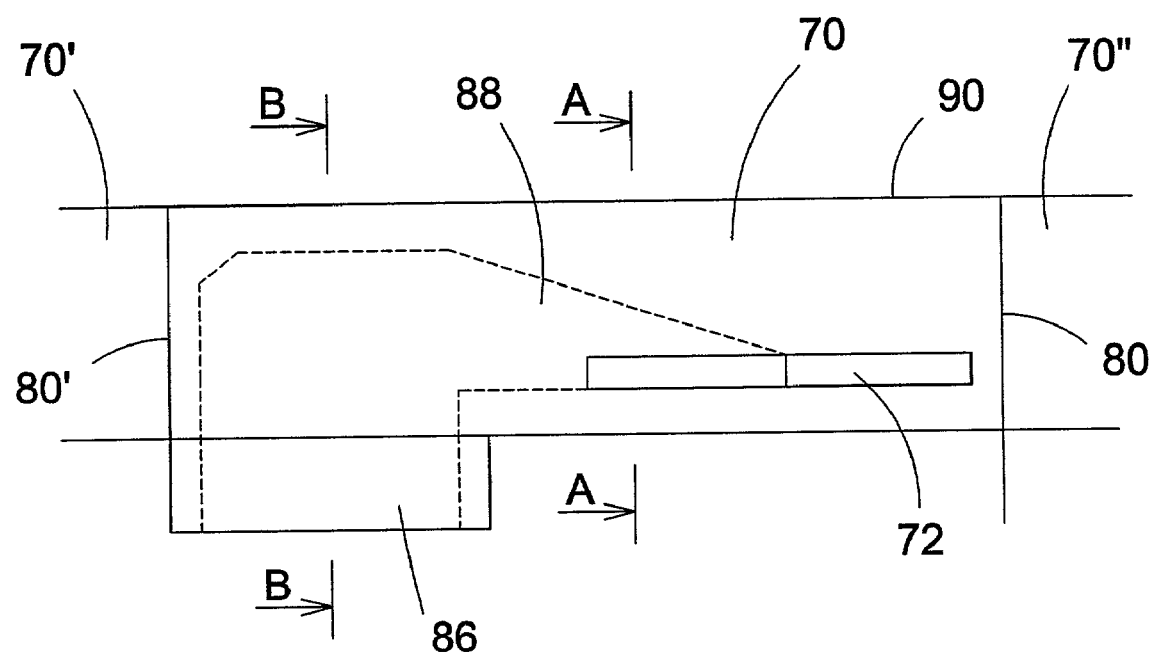
FIG. 3b is a schematic, partly cross-sectional side view of a nozzle unit according to the first embodiment of the present invention.

Near the end face 80′ of the nozzle unit 70 is a vertical inlet 86 for conducting gas from a windbox located below the grid construction 40 to the nozzle unit 70. The vertical inlet 86 is connected to the gas outlets 72 by a horizontal center channel 88. The vertical inlet 86 and the center channel 88 are also shown in FIG. 3b, which is a partly cross-sectional side view of the nozzle 70. FIG. 3b shows that the gas outlets 72 have preferably a flat vertical cross section, i.e., their individual width is much larger than their individual height.

FIG. 3b also shows that the center channel 88 is narrowing in the gas flow direction, so as to maintain a constant flow velocity and to distribute the gas as evenly as possible throughout the wide outlet openings 72. Even gas distribution at the outlet 72 is very important in order to avoid destroying the ideal gas flow pattern in the gas outlets 72 and in the adjacent trench 78. Uneven gas flow might also cause return flows and increased erosion due to material collecting within the nozzle.

FIG. 3b also shows, as a side view, how the nozzle unit 70 is by its end faces 80, 80′ connected to the adjacent nozzle units 70′, 70″. The top faces 90 of the interconnected nozzle units 70, 70′ and 70″ form a smooth top surface without protrusions or recesses to which coarse particles on the bottom of the reaction chamber could stick.

Figure 3C:
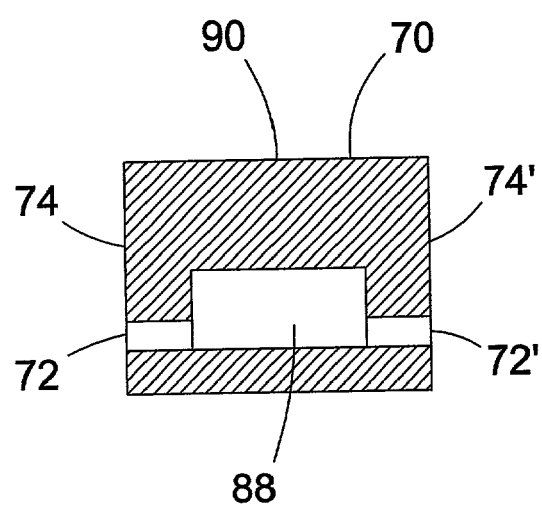
FIG. 3c is a schematic, vertical cross-sectional view of a nozzle unit according to the first embodiment of the present invention.
Figure 3D:
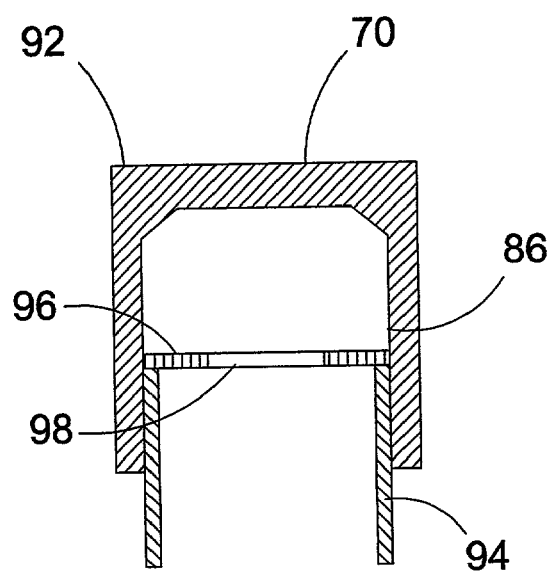
FIG. 3d is another schematic, vertical cross-sectional view of a nozzle unit according to the first embodiment of the present invention.

FIGS. 3c and 3d show vertical cross sections along lines A-A and B-B of FIG. 3b, respectively. These cross sections represent a preferred, but still exemplary shape of the nozzle unit 70. In individual embodiments of the present invention, the vertical cross section of nozzle unit 70 may differ in many aspects from that shown in FIGS. 3c and 3d. According to FIG. 3c, the bottoms of the center channel 88 and the gas outlets 72, 72′ are flat. With some types of solid materials in the fluidized bed, it may be advantageous to have the gas outlets 72, 72′ be somewhat downwards slanted in the gas flow direction. The slanting angle, which may be from about 10° to about 20°, would further minimize the risk of back-shifting of material inside the nozzle unit 70. FIGS. 3c and 3d show that the side faces 74, 74′ of the nozzle unit 70 are vertical. With some bed materials, it may be advantageous to tilt the top portions of the side faces by some amount, e.g., by about 10°, outwards, in order to further prevent back-shifting inside the nozzle 70. FIGS. 3c and 3d show a flat top face 90. In some applications, it may be advantageous to have a different top face 90. It may, e.g., be wedged, or its outer edges 92 may be rounded.

FIG. 3d shows a vertical cross section of the inlet portion of the nozzle unit 70 and a vertical duct 94 disposed in the vertical opening 86 of the nozzle unit 70. Fluidizing gas is conducted from a windbox below the grid construction to the nozzle unit 70 through the duct 94. A plate 96 with an opening 98 is disposed in the upper edge of the duct 94. The plate 96 provides a constriction, which is used to adjust the pressure drop of the nozzle unit to a suitable level. When the grid construction is slanted towards a discharge duct, the nozzle units are at different vertical levels and at different average bed pressures. Thus, they require different pressure drops in order to maintain stable fluidization of the solid material in all portions of the fluidized bed. With openings 98 of the plates 96, it is easy to adjust the pressure drops of individual nozzles as required.

Figure 4A:
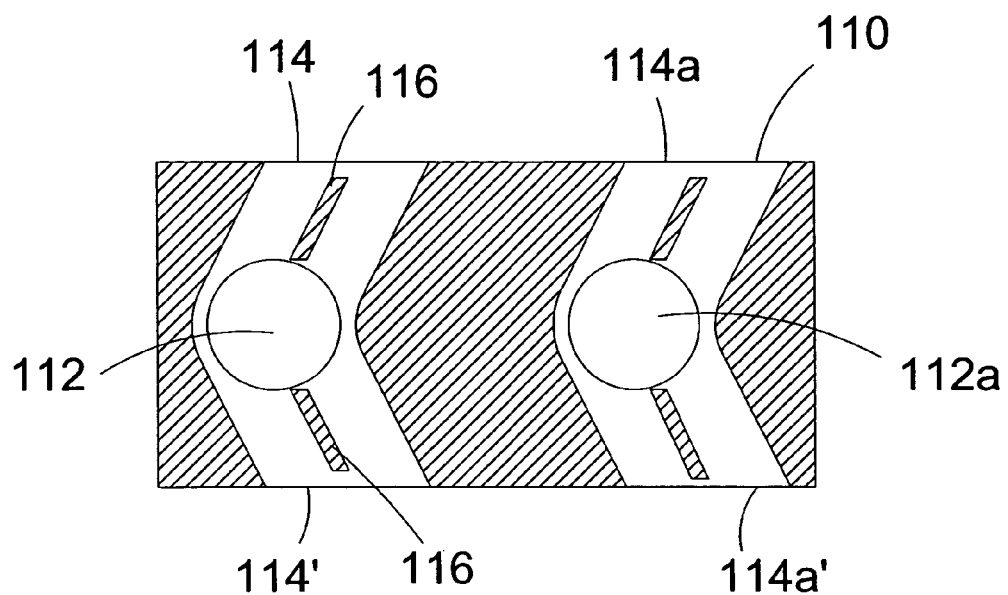
FIG. 4a is a schematic, horizontal cross-sectional view of a nozzle unit according to a second embodiment of the present invention.
Figure 4B:
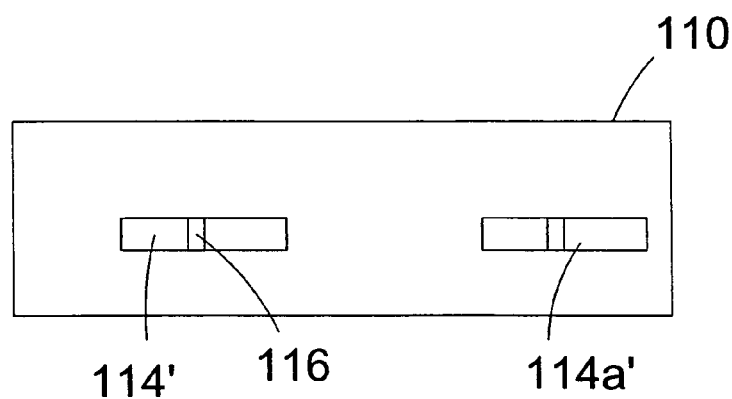
FIG. 4b is a schematic, side view of a nozzle unit according to the second embodiment of the present invention.

FIGS. 4a and 4b show another preferred nozzle unit 110 which can be used in a grid construction according to the present invention. FIG. 4a shows a horizontal cross section and FIG. 4b a side view of the same nozzle unit 110, which differs from that shown in FIGS. 3a-3d in that the nozzle unit 110 comprises two vertical openings 112, 112a, which each injects fluidizing gas to the adjacent trenches through gas outlets 114, 114′, and 114a, 114a′, respectively. In order to improve the directionality of the gas jets from the outlets 114, 114′, 114a, 114a′ each of the gas outlets is split by a splitter 116 into two portions. When the gas outlets 114 are very wide, they may be split by two, or even by more than two, splitters 116.

Figure 5A:
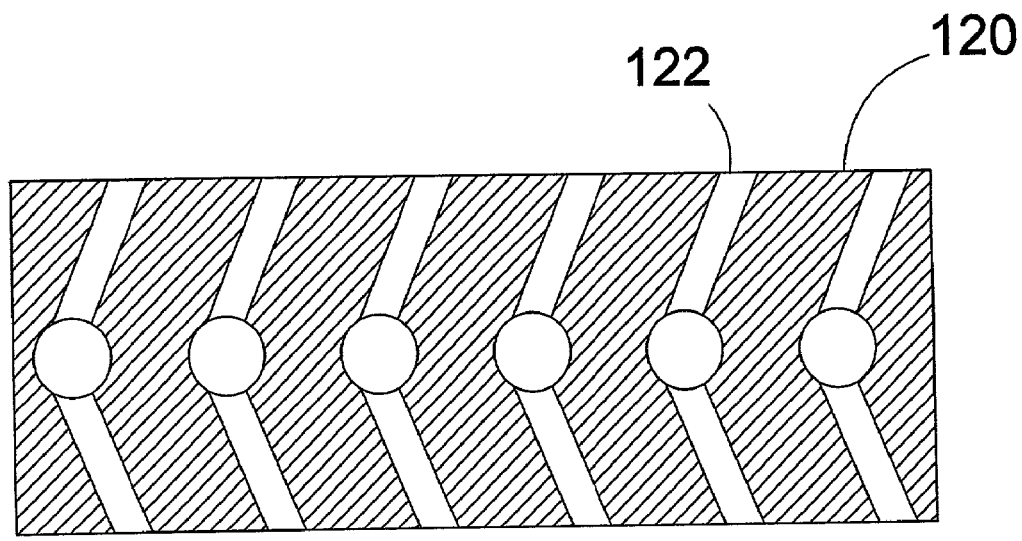
FIG. 5a is a schematic, horizontal cross-sectional view of a nozzle unit according to a third embodiment of the present invention.
Figure 5B:
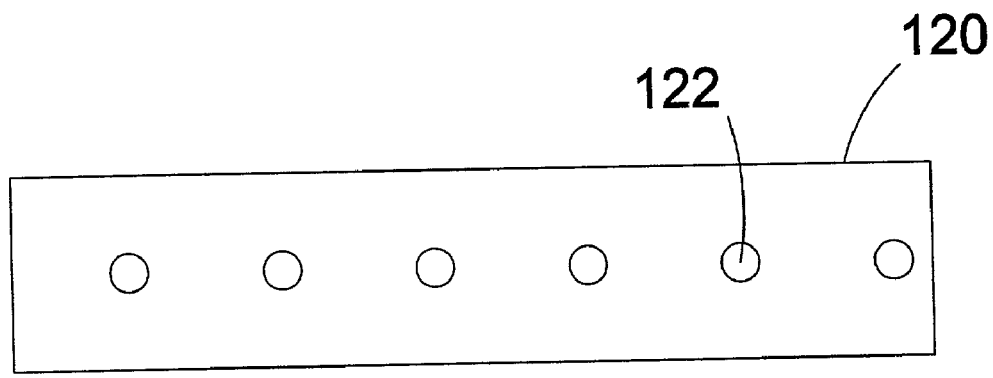
FIG. 5b is a schematic side view of a nozzle unit according to the third embodiment of the present invention.
Figure 5C:
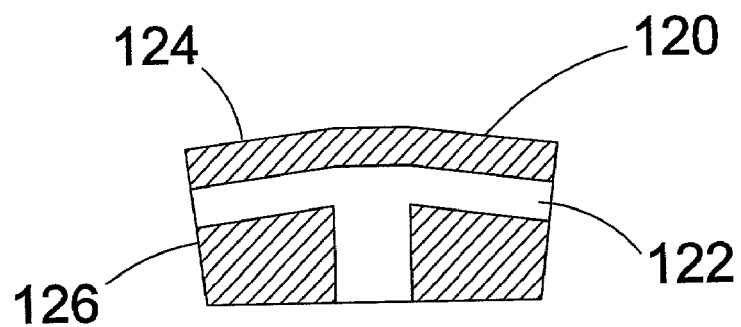
FIG. 5c is a schematic, vertical cross-sectional view of a nozzle unit according to the third embodiment of the present invention.

FIGS. 5a, 5b and 5c depict a third preferred embodiment of a nozzle unit 120 which can be utilized in a grid construction according to the present invention. FIG. 5a shows a horizontal cross section, FIG. 5b a side view, and FIG. 5c a vertical cross section, taken along one of the gas outlets 122 of FIG. 5a, of the same nozzle unit 120. The nozzle unit 120 differs from the previous ones in that the gas outlets 122 are not flat, but have a circular cross section. By having many circular gas outlets, a relatively uniform combined gas stream can be provided in the adjacent trenches. FIG. 5c shows in vertical cross section an example of a nozzle unit 120 having a wedged top surface 124, slanted side faces 126 and gas outlet channels 122.

Naturally, there are also other alternatives for constructing a nozzle unit for a grid construction according to the present invention. One possibility is to form a horizontal center channel connected to a vertical inlet channel, as shown in FIG. 3a, which center channel is connected to several circular outlet channels, as shown in FIG. 5a.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

We claim:

1. A grid construction for a fluidized bed reactor, the reactor including a reaction chamber defined by substantially vertical walls, in which a fluidized bed of solid particles is maintained, and a windbox under the reaction chamber, in a lower portion of the reactor, said grid construction being positioned between the reaction chamber and the windbox and comprising:

at least one discharge duct for withdrawing coarse material from the reaction chamber;

multiple nozzle lines having a continuous structure providing two smooth side faces and a smooth top surface for distributing fluidizing gas from the windbox into the reaction chamber and for suspending the fluidized bed of solid particles in the reaction chamber; and continuous elongated trenches between the side faces of said nozzle lines, wherein said nozzle lines comprise multiple gas outlets at the side faces of said nozzle lines for directing fluidizing gas jets towards an adjacent trench, and wherein the multiple gas outlets have at each side face a common gas flow direction, which forms in a horizontal plane an angle from about twenty degrees to about seventy degrees with the normal of the direction of an adjacent trench so as to direct solid material along the trench towards one of the at least one discharge duct.

2. A grid construction according to claim 1, wherein said nozzle lines comprise gas outlets at two opposite side faces of said nozzle lines, for directing fluidizing gas jets to two adjacent trenches.

3. A grid construction according to claim 1, wherein the main gas flow direction of the multiple gas outlets is substantially horizontal, so as to form a substantially horizontal gas jet.

4. A grid construction according to claim 1, wherein the multiple gas outlets have a horizontal width of at least four times their height, and the total horizontal width of the gas outlets in a side face of a nozzle line extends at least about twenty percent of the total horizontal dimension of the side face of the nozzle line.

5. A grid construction according to claim 4, wherein the total horizontal width of the gas outlets in a side face of a nozzle line extends at least about forty percent of the total horizontal dimension of the side face of the nozzle line.

6. A grid construction according to claim 1, wherein said nozzle lines comprise multiple successive nozzle units having side faces and end faces, wherein successive nozzle units are in mutual contact on their end faces so as to form one of said multiple nozzle lines.

7. A grid construction according to claim 6, wherein said nozzle units comprise a vertical duct being in flow connection with the windbox and at least one of the multiple gas outlets.

8. A grid construction according to claim 7, wherein said nozzle units comprise a substantially horizontal center channel connecting the vertical duct and at least one of the multiple gas outlets, which center channel has an in-flow direction decreasing vertical cross-sectional area.

9. A grid construction according to claim 7, further comprising a restriction, for adjusting a pressure drop of the fluidizing gas, disposed in an upper portion of the vertical duct.

10. A grid construction according to claim 1, wherein said multiple nozzle lines are formed of cast refractory.

11. An apparatus according to claim 1, wherein the gas jets are injected substantially horizontally.

12. An apparatus according to claim 1, wherein the gas jets are injected as beams each having a width which is at least four times its respective height.

* * * * *